(12) United States Patent
Byerly et al.

(10) Patent No.: US 9,390,595 B2
(45) Date of Patent: Jul. 12, 2016

(54) COMBINATION PRINTER AND ITS PAPER

(71) Applicant: CATALINA MARKETING CORPORATION, St. Petersburg, FL (US)

(72) Inventors: Baxter Byerly, Brooksville, FL (US); Jeffrey R. Mount, Palm Harbor, FL (US)

(73) Assignee: Catalina Marketing Corporation, St. Petersburg, FL (US)

( * ) Notice: Subject to any disclaimer, the term of this patent is extended or adjusted under 35 U.S.C. 154(b) by 0 days.

(21) Appl. No.: 14/320,446

(22) Filed: Jun. 30, 2014

(65) Prior Publication Data

US 2014/0312111 A1  Oct. 23, 2014

Related U.S. Application Data

(63) Continuation of application No. 12/692,419, filed on Jan. 22, 2010, now Pat. No. 8,764,138, which is a continuation of application No. 11/488,126, filed on Jul. 18, 2006, now Pat. No. 7,708,360.

(Continued)

(51) Int. Cl.
*G07G 5/00* (2006.01)
*G07G 1/00* (2006.01)
(Continued)

(52) U.S. Cl.
CPC ........... *G07G 1/0009* (2013.01); *B41J 2/04573* (2013.01); *B41J 3/407* (2013.01); *B41J 3/445* (2013.01); *B41J 3/546* (2013.01); *B41J 3/60* (2013.01); *G07G 5/00* (2013.01); *B41J 2/01* (2013.01); *B41J 2/0458* (2013.01);

(Continued)

(58) Field of Classification Search
CPC ..... G07G 1/0009; G07G 5/00; B41J 2/04573; B41J 2/01; B41J 2/04536; B41J 2/04541; B41J 2/0458; B41J 2/2114; B41J 3/407; B41J 3/445; B41J 3/546; B41J 3/60; B41J 11/0015
USPC ............................................................ 347/2
See application file for complete search history.

(56) References Cited

U.S. PATENT DOCUMENTS 3,925,788 A    12/1975  Kashio ........................... 346/75
4,261,036 A     4/1981  Nagasaka et al. ............. 364/405

(Continued)

FOREIGN PATENT DOCUMENTS

CN    1702695    11/2005
EP    0928698    7/1998

(Continued)

OTHER PUBLICATIONS

European Office Action dated Dec. 12, 2011 in EP Application No. 09012094.0, 6 pages.

(Continued)

*Primary Examiner* — Stephen Meier
*Assistant Examiner* — Alexander D Shenderov
(74) *Attorney, Agent, or Firm* — Sheppard Mullin Richter & Hampton LLP (57) ABSTRACT

A computer network system and method for printing purchase transaction receipts includes a novel printer physical structure, data structure, and control logic for printing on both sides of a register receipt, business rules designed to facilitate the two sided printing, and print paper designed to facilitate two sided printing.

16 Claims, 6 Drawing Sheets

Related U.S. Application Data (60) Provisional application No. 60/778,410, filed on Mar. 3, 2006, provisional application No. 60/742,908, filed on Dec. 7, 2005, provisional application No. 60/742,909, filed on Dec. 7, 2005.

(51) Int. Cl.

| | | |
|---|---|---|
| *B41J 29/393* | (2006.01) | |
| *B41J 3/407* | (2006.01) | |
| *B41J 3/54* | (2006.01) | |
| *B41J 3/60* | (2006.01) | |
| *B41J 3/44* | (2006.01) | |
| *B41J 2/01* | (2006.01) | |
| *B41J 2/045* | (2006.01) | |
| *B41J 2/21* | (2006.01) | |
| *B41J 11/00* | (2006.01) | |

(52) U.S. Cl.
CPC .......... *B41J 2/04536* (2013.01); *B41J 2/04541* (2013.01); *B41J 2/2114* (2013.01); *B41J 11/0015* (2013.01)

(56) References Cited

U.S. PATENT DOCUMENTS

| | | | |
|---|---|---|---|
| 4,980,725 A | 12/1990 | Sumida | |
| 5,456,539 A | 10/1995 | Wright et al. | |
| 5,570,451 A | 10/1996 | Sakaizawa et al. | |
| 5,619,558 A * | 4/1997 | Jheeta ................... G06Q 30/02 | |
| | | | 235/379 |
| 5,633,662 A | 5/1997 | Allen et al. | |
| 5,634,090 A | 5/1997 | Narukawa et al. ............ 395/115 |
| 5,666,215 A | 9/1997 | Fredlund et al. | |
| 5,688,154 A | 11/1997 | Goda et al. | |
| 5,737,729 A | 4/1998 | Denman | |
| 5,767,886 A | 6/1998 | Kawakami et al. | |
| 5,857,175 A | 1/1999 | Day et al. | |
| 5,917,513 A | 6/1999 | Miyauchi et al. | |
| 6,021,362 A | 2/2000 | Maggard et al. ............. 700/234 |
| 6,076,068 A | 6/2000 | DeLapa et al. | |
| 6,119,933 A | 9/2000 | Wong et al. .................. 235/380 |
| 6,129,274 A | 10/2000 | Suzuki .......................... 235/381 |
| 6,151,038 A | 11/2000 | Suzuki | |
| 6,203,131 B1 | 3/2001 | Wiklof | |
| 6,231,249 B1 | 5/2001 | Harris | |
| 6,246,997 B1 | 6/2001 | Cybul et al. .................... 705/27 |
| 6,252,673 B1 | 6/2001 | Miyasaka et al. ............ 358/1.18 |
| 6,313,925 B1 | 11/2001 | Decker et al. | |
| 6,341,269 B1 | 1/2002 | Dulaney et al. ................. 705/22 |
| 6,344,899 B1 | 2/2002 | Tabata et al. | |
| 6,351,735 B1 | 2/2002 | Deaton et al. | |
| 6,415,261 B1 | 7/2002 | Cybul et al. .................... 705/14 |
| 6,663,304 B2 | 12/2003 | Vives et al. ..................... 400/82 |
| 6,721,613 B1 | 4/2004 | Yamamoto et al. ............. 700/90 |
| 6,767,073 B2 | 7/2004 | Tschida | |
| 7,014,110 B2 | 3/2006 | Minowa et al. ............... 235/383 |
| 7,145,673 B1 | 12/2006 | Lin ................................ 358/1.15 |
| 7,156,304 B2 | 1/2007 | Minowa et al. ............... 235/383 |
| 7,424,443 B2 | 9/2008 | Yanagisawa et al. .......... 705/16 |
| 7,689,461 B2 | 3/2010 | Minowa .......................... 705/24 |
| 7,708,360 B2 | 5/2010 | Byerly et al. ..................... 347/2 |
| 7,914,213 B2 | 3/2011 | Scarton .......................... 400/76 |
| 8,159,709 B2 | 4/2012 | Young et al. ................. 358/1.16 |
| 8,764,138 B2 | 7/2014 | Byerly et al. ..................... 347/2 |
| 8,964,244 B2 | 2/2015 | Mount et al. .................. 358/1.9 |
| 9,305,438 B2 | 4/2016 | Mount | |
| 2001/0021331 A1 | 9/2001 | Brewington et al. | |
| 2001/0032128 A1 | 10/2001 | Kepecs ........................... 705/14 |
| 2001/0032130 A1 | 10/2001 | Gabos et al. ................... 705/14 |
| 2001/0034775 A1 | 10/2001 | Minowa ........................ 709/218 |
| 2002/0109729 A1 | 8/2002 | Dutta ............................. 345/790 |
| 2002/0120514 A1 | 8/2002 | Hagmeier et al. ............. 705/14 |
| 2002/0129002 A1 | 9/2002 | Alberts et al. | |
| 2002/0143655 A1 | 10/2002 | Elston et al. | |
| 2003/0023492 A1 | 1/2003 | Riordan et al. ................. 705/16 |
| 2003/0036979 A1 | 2/2003 | Tokorotani ..................... 705/27 |
| 2003/0046154 A1 | 3/2003 | Larson et al. .................. 705/14 |
| 2003/0050842 A1 | 3/2003 | Wada et al. | |
| 2003/0061100 A1 | 3/2003 | Minowa ......................... 705/14 |
| 2003/0081238 A1 | 5/2003 | Lester et al. ................. 358/1.14 |
| 2003/0101095 A1 | 5/2003 | Suzuki | |
| 2003/0121929 A1 | 7/2003 | Liff et al. | |
| 2003/0197782 A1 | 10/2003 | Ashe et al. | |
| 2003/0227510 A1 | 12/2003 | Payne | |
| 2004/0004644 A1 | 1/2004 | Komatsu et al. | |
| 2004/0030600 A1 | 2/2004 | Lacroix .......................... 705/16 |
| 2004/0034570 A1 | 2/2004 | Davis | |
| 2004/0046971 A1 | 3/2004 | Lapstun et al. ................ 358/1.1 |
| 2004/0054583 A1 | 3/2004 | Nye, III et al. ................. 705/14 |
| 2004/0059634 A1 | 3/2004 | Tami et al. ..................... 705/17 |
| 2004/0109190 A1 | 6/2004 | Nagai ........................... 358/1.13 |
| 2004/0148223 A1 | 7/2004 | Ghaffar et al. | |
| 2004/0227972 A1 | 11/2004 | Uchikawa ................... 358/1.14 |
| 2004/0246287 A1 | 12/2004 | Usuda | |
| 2005/0040230 A1 | 2/2005 | Swartz et al. ................. 235/383 |
| 2005/0080651 A1 | 4/2005 | Morrison et al. | |
| 2005/0171845 A1 | 8/2005 | Halfman et al. ............... 705/14 |
| 2005/0242178 A1 * | 11/2005 | Minowa ............ G06Q 30/0225 |
| | | | 235/383 |
| 2005/0247781 A1 | 11/2005 | Minowa et al. ............... 235/383 |
| 2005/0264850 A1 | 12/2005 | Kim et al. | |
| 2005/0270550 A1 | 12/2005 | Sumio ......................... 358/1.13 |
| 2005/0271446 A1 | 12/2005 | Minowa | |
| 2006/0126102 A1 | 6/2006 | Sakuda ........................ 358/1.15 |
| 2006/0143075 A1 | 6/2006 | Carr et al. | |
| 2006/0287872 A1 | 12/2006 | Simrell ............................ 705/1 |
| 2006/0289633 A1 | 12/2006 | Moreland et al. ............ 235/381 |
| 2007/0045405 A1 | 3/2007 | Rothschild | |
| 2007/0120943 A1 | 5/2007 | Van Demark et al. ........ 347/221 |
| 2007/0206209 A1 | 9/2007 | Mount | |
| 2007/0221728 A1 | 9/2007 | Ferro et al. ................... 235/383 |

FOREIGN PATENT DOCUMENTS

| | | |
|---|---|---|
| EP | 1139316 | 10/2001 |
| EP | 1292096 | 3/2003 |
| EP | 1321307 | 6/2003 |
| EP | 1267565 | 12/2003 |
| EP | 1 467 301 | 10/2004 |
| FR | 2 548 805 | 1/1985 |
| JP | 2-207397 A | 8/1990 |
| JP | H09-223274 | 8/1997 |
| JP | 10-214383 | 8/1998 |
| JP | H10-214383 | 8/1998 |
| JP | 11-212527 | 8/1999 |
| JP | H11-212527 | 8/1999 |
| JP | 2000-105786 | 4/2000 |
| JP | 2002-14917 | 1/2002 |
| JP | 2002-234215 | 8/2002 |
| JP | 2003-58950 | 2/2003 |
| JP | 2004-013708 | 1/2004 |
| JP | 2004098503 | 4/2004 |
| JP | 2005-182396 | 7/2005 |
| JP | 2005-335125 | 12/2005 |
| JP | 2005-343028 | 12/2005 |
| JP | 2012-252720 | 12/2012 |
| WO | WO 98/21713 | 5/1998 |

OTHER PUBLICATIONS

Chinese Office Action dated Dec. 16, 2011 in Application No. CN 200680045022.3, with English translation, 9 pages.
Canadian Office Action dated Feb. 10, 2012 in Application No. CA 2,637,946, 4 pages.
European Office Action dated Feb. 17, 2012 in Application No. EP 06786463.7, 6 pages.
U.S. Office Action dated Mar. 29, 2012 in U.S. Appl. No. 12/692,419, 16 pages.
U.S. Office Action dated Mar. 30, 2012 in U.S. Appl. No. 11/481,789, 10 pages.
Japanese Office Action dated May 15, 2012 in Application No. JP 2008-557494, with English translation, 6 pages.

(56) References Cited

OTHER PUBLICATIONS

Japanese Office Action dated May 29, 2012 in Application No. JP 2008-544322, with English translation, 6 pages.
Japanese Office Action dated May 29, 2012 in Application No. JP 2008-544317, with English translation, 5 pages.
Chinese Office Action dated Jun. 15, 2012 in Application No. CN 200680045022.3, with English translation, 12 pages.
U.S. Office Action dated Jun. 25, 2012 in U.S. Appl. No. 12/758,901, 10 pages.
U.S. Notice of Allowance dated Sep. 4, 2012 in U.S. Appl. No. 11/481,789, 7 pages.
Japanese Office Action dated Oct. 9, 2012 in Application No. JP 2008-544322, with English translation, 4 pages.
Chinese Office Action dated Oct. 9, 2012 in Application No. CN 200680045022.3, with English translation, 14 pages.
Canadian Office Action dated Oct. 29, 2012 in Application No. CA 2,624,622, 3 pages.
Japanese Office Action dated Nov. 1, 2012 in Application No. JP 2008-557494, with English translation, 4 pages.
U.S. Office Action dated Nov. 8, 2012 in U.S. Appl. No. 12/692,419, 20 pages.
U.S. Office Action dated Mar. 18, 2013 in U.S. Appl. No. 12/758,901, 12 pages.
U.S. Office Action dated Mar. 25, 2013 in U.S. Appl. No. 11/680,938, 15 pages.
Canadian Office Action dated Mar. 21, 2013 in Application No. CA 2,637,946, 5 pages.
U.S. Office Action dated May 29, 2013 in U.S. Appl. No. 12/692,419, 17 pages.
U.S. Office Action dated Jul. 19, 2013 in U.S. Appl. No. 12/758,901, 18 pages.
U.S. Office Action dated Nov. 5, 2013 in U.S. Appl. No. 11/680,938, 18 pages.
U.S. Office Action dated Jan. 3, 2014 in U.S. Appl. No. 12/692,419, 10 pages.
U.S. Notice of Allowance dated Mar. 3, 2014 in U.S. Appl. No. 12/692,419, 9 pages.
Chinese Office Action dated Mar. 19, 2014 in Application No. CN 201110360158.6, 16 pages.
Nov. 9, 2007, PCT International Search Report PCT/US07/63051.
Nov. 9, 2007, PCT Written Opinion PCT/US07/63051.
Dec. 26, 2007, PCT International Search Report PCT/US06/26313.
Dec. 26, 2007, PCT Written Opinion PCT/US06/26313.
Jun. 17, 2008, PCT International Search Report PCT/US06/30716.
Jun. 17, 2008, PCT Written Opinion PCT/US06/30716.
Aug. 15, 2007, PCT International Search Report PCT/US06/11843.
Aug. 15, 2007, PCT Written Opinion of the ISA PCT/US06/11843.
Jun. 10, 2009, European Search Report EP 06 78 6463.
Jul. 19, 2007, Claims filed by amendment filed Apr. 7, 2009 in U.S. Appl. No. 11/366,397.
Jun. 7, 2007, Claims allowed by Notice of Allowance mailed Dec. 16, 2009 in U.S. Appl. No. 11/488,126.
Claims filed Jan. 22, 2010 in U.S. Appl. No. 12/692,419.
Jun. 7, 2007, Claims filed by preliminary amendment filed Jun. 3, 2008 in U.S. Appl. No. 11/481,789.
English translation of Feb. 5, 2010 Chinese office action in related case, application No. CN 200680045022.3.
Extended European Search Report in EP 09012094, dated Nov. 9, 2009.
US Office Action dated Apr. 16, 2010 in related case U.S. Appl. No. 11/481,789.
English translation of Mar. 11, 2010 Chinese office action in related case, application No. CN 200680045132.X.
English translation of Mar. 2, 2010 Chinese office action in related case, application No. CN 200780005831.6.
CIPO office action dated May 19, 2010 in related case CA 2,624,620.
Jul. 13, 2010, CIPO office action dated Jul. 13, 2010 in related case CA 2,637,946.
European Search Report dated Aug. 13, 2010 in related case EP 06786463.7.
English translation of Abstract EP 09012094.0.
Supplemental European Search Report dated Feb. 4, 2011 in related application 06789518.
Abstracts of Japan, publication No. 2004098503, published Apr. 2, 2004.
Office action in related application CA 2,624,622, dated Jul. 11, 2011.
Abstracts of Japan, publication No. 2000105786, published Apr. 2000.
U.S. Office Action dated May 22, 2014 in U.S. Appl. No. 11/680,938, 21 pages.
U.S. Office Action dated Aug. 1, 2014 in U.S. Appl. No. 12/758,901, 21 pages.
European Office Action dated Sep. 2, 2014 in Application No. 07757700.5, 5 pages.
U.S. Notice of Allowance dated Oct. 20, 2014 in U.S. Appl. No. 12/758,901, 31 pages.
U.S. Office Action dated Jan. 29, 2015 in U.S. Appl. No. 11/680,938, 19 pages.
European Office Action dated Feb. 24, 2015 in Application No. 06786463.7, 6 pages.
Japanese Office Action dated Jun. 2, 2015 in Application No. 2014-176762, 9 pages.
Anonymous: "SVG.Open/Carto.net 2002, Zurich, SVG as a Page Description Language", Feb. 18, 2015, XP055170440, Retrieved from the Internet: URL: http://www.svgopen.org/2002/papers/danilo_fujisawa_svg_as_page_description_language/ [retrieved on Feb. 18, 2015], 11 pages.
Japanese Office Action dated Feb. 23, 2016 in Application No. 2014-176762, 6 pages.

* cited by examiner

COMBINATION PRINTER AND ITS PAPER

CROSS REFERENCE TO RELATED APPLICATIONS

This application is a continuation of U.S. patent application Ser. No. 12/692,419, entitled "Combination Printer and Its Paper," filed on Jan. 22, 2010, which is a continuation of U.S. patent application Ser. No. 11/488,126, filed on Jul. 18, 2006, which claims the benefit of U.S. provisional application 60/742,908, filed Dec. 7, 2005 entitled "POS Network Including Color Printing and Color Highlighting"; and claims the benefit of U.S. provisional application 60/742,909, filed Dec. 7, 2005, entitled "POS Network Including Color Printing and Color Highlighting"; and claims the benefit of U.S. provisional application 60/778,410, filed Mar. 3, 2006 entitled "POS Network Including Color Printing and Color Highlighting". This application incorporates by reference each of the foregoing applications in their entirety.

FIELD OF THE INVENTION

This invention relates generally to Point Of Sale (POS) computer systems (CSs).

BACKGROUND ART

Retail store marketing systems for marketing in many retail stores include a central computer system (CS), a plurality of retail store POS computers, one at each retail store, and plurality of local marketing computers, one residing at each retail store, and communication networks enabling communication between the central CS and the retail stores. The networks include both a local area network (LAN) at each retail store and a wide area network (WAN) such as the Internet enabling communication with the central CS. Each local marketing computer may be a network client in the retail store's LAN, and each marketing computer also have a separate telephone modem dial-up or network connection enabling it to communicate with the central CS. The local marketing computers typically include a text file (database) of rules from which printing of specified coupons are triggered by signals from the POS computers in the retail store. Marketing printing occurs at a marketing computer printer connected to the marketing computer. Typical retail stores have a plurality of checkout lanes. At the end of each lane is a POS terminal and a POS terminal printer connected to the POS computer via the LAN. There is one marketing computer adjacent each POS printer. The marketing computer has a correspondence identifying which marketing printer is adjacent which POS printer.

In response to reading product bar code items (product identifier and quantity data) and a customer identification number (CID) during each transaction, the POS terminal transmits over the LAN a marketing computer data stream, the marketing computer data stream including header information in a specification that the marketing computer is programmed to read, so that the marketing computer can interpret the data read at the POS terminal, and then process and determine promotions to offer to the customer. This data includes for example customer identification, product identifications, and coupon identifications. The POS terminal is also coded to transmit end of transaction, total of transaction, tender type, and end of transaction data over the LAN with a header that is recognizable to the marketing computer.

The POS terminal is also programmed to cache the transaction data for a customer's transaction at the POS, as it is received, and at the end of the transaction, transmit a log of the transaction data for that transaction, in a POS computer data stream in a format that the POS computer is programmed to read, to the POS computer.

The data in the marketing computer data stream is generally redundant to the data in the POS computer data stream. The marketing computer generally does not read the data formatted for reading by the POS computer, and vice versa.

In prior art systems, the end of transaction (EOT) signal results in a prompt instructing the POS printer to immediately print (place in printer queue memory from which printing occurs without any further signals being required) transaction data for printing the register receipt for the customer's purchase transaction. The register receipt lists descriptions of items purchases, quantity, price, and total, amongst other data. The register receipt is a portion of a roll of paper tape stored in the printer. Typical paper tapes are on the order of a several centimeters in width. The length of the register receipt for purchase transaction depends upon the number of items purchased and listed on the register receipt.

Herein, CS means computer system.
Herein, POS means point of sale.

SUMMARY OF THE INVENTION

Objects of the Invention

It is an object of this invention to use single printer at the point of sale for printing both (1) a retail store's register receipt printing functions and (2) marketing communications.

It is an object of this invention to facilitate printing marketing communications in and with graphics.

It is an object of this invention to minimize ink used for printing at a POS.

It is an object of this invention to efficiently use all space on front and back surfaces of a paper register receipt for communicating printed information.

It is an object of this invention to prevent ink bleed between opposing sides of a paper receipt.

It is an object of this invention to facilitate printing on opposite sides of register receipts.

BRIEF DESCRIPTION OF DRAWINGS

The novel inventions are described with reference to the following figures, wherein like reference numerals refer to the same or similarly functioning elements.

DETAILED DESCRIPTION OF EMBODIMENTS

Figure 1:
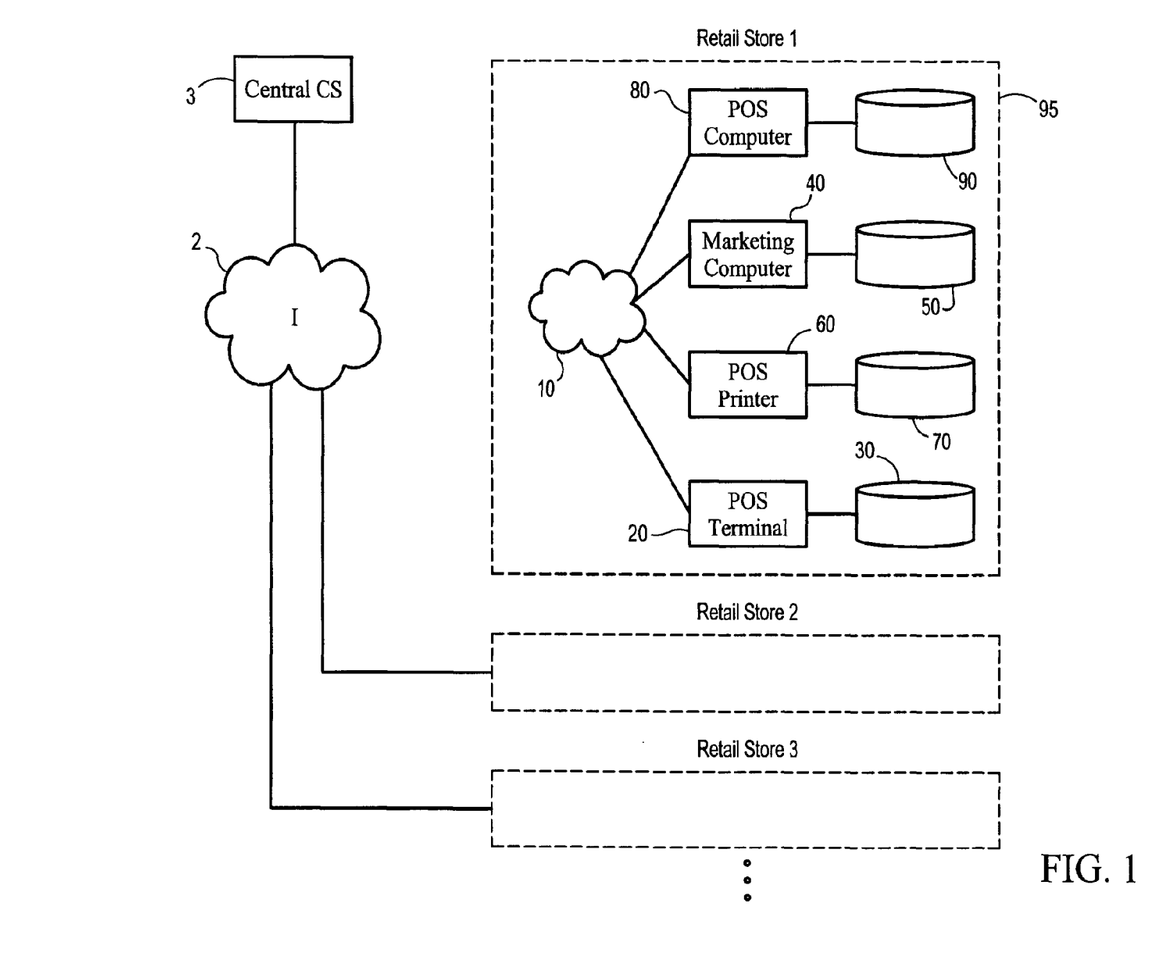
FIG. 1 is a schematic of a novel network CS 1.

FIG. 1 shows novel network CS 1 including central CS 3, wide area network such as the Internet 2, Local Area Network (LAN) 10, POS terminal 20, marketing computer 40, POS printer 60, boundary of retail store 95, and boundaries of additional retail stores indicating that additional retail store CSs may exist in the network. FIG. 1 also shows POS terminal database 30 associated with POS terminal 20, marketing computer database 50 associated with marketing computer 40, and printer database 70 associated with POS printer 60, and POS computer database 90 associated with POS computer 80. Each computer controls read and write access to its associated database. Optionally, POS printer 60 is a terminal or otherwise controlled by POS computer 80 in which case POS computer 80 performs the processing functions associated herein with printer 60 and receives data directed to printer 60.

One or more of devices 20, 40, 60, and 80 have a network connection to WAN 2, and may act as gateways allowing other devices on the LAN to access WAN 2. Optionally, a separate gateway device resides on LAN 10 enabling devices on LAN 10 to access WAN 2.

Marketing computer 40, POS printer 60, POS computer 80, and preferably also POS terminal 20, each include a digital central processing unit, human user input and output devices, and associated high-speed memory. Each one of marketing computer 40, POS printer 60, POS computer 80, and preferably also POS terminal 20, stores network protocols and code for converting and transmitting data in those network protocols, such as TCP/IP. Devices 20, 40, 60, and 80 are connected to LAN 10 enabling them to communicate via data packet transport with one another as specified herein.

POS terminal 20 is configured to process purchase transactions by receiving transaction data, and transmitting the transaction data to LAN 10. POS terminal 20 is configured to transmit the transaction data in two different modes. First, it is configured to transmit each datum (product identifier, quantity, customer identification) as each datum is received in POS terminal 20 over LAN 10 to marketing computer 40. Second, it is configured to transmit a log of each transaction containing all product identifiers, pricing, and related, over LAN 10 to POS computer 80. The data format specification for transmissions to marketing computer 40 may be different than the data format specification for transmission of data to POS computer 80. Alternatively, each packet may contain indicia identifying an address of the intended destination device.

Either POS terminal 20 or POS computer 80 is configured to generate and transmit, to POS printer 60, POS print instructions 710, and configured to take that action in response to identification of an end of transaction (EOT). The EOT signals the completion of the customer's purchase transaction at the POS terminal. POS print instructions 710 include instructions for printing a purchase transaction receipt.

A purchase transaction receipt includes printed text that specifies description and price of product items in the customer's purchase order.

Marketing computer 40 is configured to generate and transmit to POS printer 60 combined marketing and POS print instructions 720 for printing both on the same paper a purchase transaction receipt and certain marketing material. The marketing material may be on the same side of the paper as the transaction receipt information. The marketing material may be on the opposite side of the paper from the transaction receipt information. The marketing material may include incentive offers, such as coupons, and advertisements.

Marketing computer 40 is configured to process data from a POS transaction, preferably as it receives that data transmitted by POS terminal 20 over LAN 10. Optionally, marketing computer 40 logs the transaction data received for a customer's purchase transaction and awaits receipt of an EOT signal for the transaction prior to processing the data, and then generates and transmits combined marketing and POS print instructions 720 to POS printer 60. The combined marketing and print instructions 720 instruct the printer to print register receipt information and marketing information.

POS printer 60 may be configured to not print POS print instructions 710 it received from either POS terminal 20 or POS computer 80, if POS printer 60 timely receives combined marketing and POS print instructions 720 from marketing computer 40.

POS printer 60 preferably includes conventional structure or code for printing based upon print instructions, and also conventional structure or code for receiving and interpreting information in at least one network protocol, such as TCP/IP.

Either marketing computer 40 or POS printer, or both collectively, are configured to specify location on register receipt paper of register receipt information and marketing information, including whether to print on only one side of the paper tape or both side of the paper tape, what information should be on each side, and font and graphics size scaling to fit all information onto a certain length of the paper tape.

Central CS 3 stores transaction data in association with customer and store identifiers for a plurality of stores and many customers. Central CS 3 may perform marketing processing to determine what specific marketing content to provide to a particular consumer, in which case it transmits to marketing computer 40 the customer's identifier in association with either the specific marketing content (coupon details or the like) or an identifier of the specific marketing content. Marketing computer 40 may refer to this information when processing transaction data after receiving the same customer identifier during that customer's subsequent purchase transaction in the retail store.

POS computer 80 is configured to log transaction information for transaction in retail store 95, track inventory, track income, and generate corresponding reports. It may also be the authority instructing the POS printers in the store to print register receipts.

POS terminal 20 and POS terminal database 30 are associated with a single checkout lane or station. There can be numerous checkout stations in each retail store where a customer may pay for merchandise, and where the product identification codes and currency transaction information for a customer's transaction may be entered at that POS terminal.

Marketing computer 40 runs code implementing marketing criteria on transaction data associated with CIDs to determine specific marketing content to associate with the CIDs. Marketing computer 40 distributes either specified content or identifiers of said specified content it associates with a CID to POS printer 60.

Marketing criteria may depend on transaction history of a customer, customer demographics, preferences on the part of the marketer. Marketing computer 40 may store transaction history data (data from prior transactions including product codes and customer identifiers associated with each one of a set of prior transactions). Alternatively, marketing computer 40 may store CIDs and associated incentive offers to provide to customers having that CID, wherein the list of CIDs and associated incentive offers are provided to the marketing computer by central CS 3.

POS terminal database 30, marketing computer database 50, printer database 70, and POS computer database 90 are each preferably configured to receive and store transaction data for a retail store. Preferably, marketing computer database 50 and printer database 70 are both configured to also receive and store marketing content data.

Figure 2:
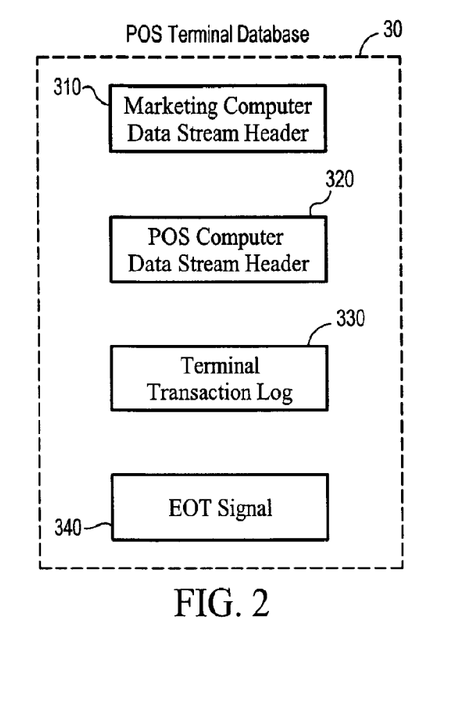
FIG. 2 is a schematic of a data structure of POS terminal database 30 of FIG. 1.

FIG. 2 shows a data structure for POS terminal database 30 of FIG. 1 as including marketing computer data stream header 310, POS computer data stream header 320, terminal transaction logs 330, and EOT signal 340.

Marketing computer data stream header 310 either specifies a logical address, (IP address, port number, or the like, for marketing computer 40) or specifies a data format for data following it in the data stream. If the latter, marketing computer 40 is configured to read data on the LAN in that format.

POS computer data stream header 320 either specifies a logical address, (IP address, port number, or the like, for POS computer 80) or specifies a data format for data following it in the data stream. If the latter, POS computer 40 is configured to read data on the LAN in that format.

Terminal transaction log 330 logs transaction information for each transaction, such as product identifiers, coupon identifiers, discounts applied, time, date, terminal ID, amounts, total, and payment type (credit card type, check, case, etc).

EOT signal 340 is data that specifies EOT.

Figure 3:
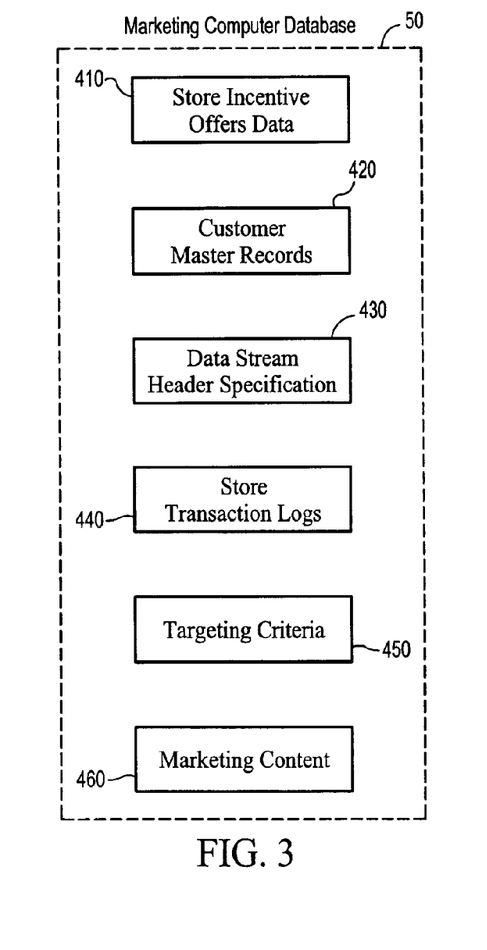
FIG. 3 is a schematic of a data structure of marketing computer database 50 of FIG. 1.

FIG. 3 shows marketing computer database 50 of FIG. 1 including stored incentive data 410, customer master records 420, data stream header specification 430, store logs 440, targeting criteria 450, and marketing content 460. Data stream header specification 430 exists when the specification of data format for data to be read by the marketing 40 differs from the specification for data to be read by POS computer 80.

Stored incentive offers data 410 include a customer identifier and marketing content defining an incentive offer, such as a coupon. Preferably, data 410 also includes status fields for identifying the status of the offer, such as not yet provided to the customer, provided (previously printed at a point of sale printer or otherwise) to the customer, and redeemed by the customer. The customer identifier may for example be a loyalty card identifier, some numerals from a credit card or other form of customer payment.

Customer master records 420 may include the customer's transaction history in association with the customer's identifier; marketing analysis performed on the customer's transaction history by either marketing computer 40, POS computer 80, or central computer 3; and other customer specific information such as address and telephone, account numbers, demographics. Customer master records may be used to generate stored incentive offers data 410.

Data stream header specification 430 is optional. It specifies the format of data streams that marketing computer 40 recognizes on LAN 10. For example, the header for the sequential transmission from terminal 10 of product identifiers associated with a transaction occurring at terminal 10. For example, not the header for the log file transmitted from POS terminal 20 to POS computer 80 at the end of a transaction.

Store transaction logs 440 include store transaction information, such as items purchased, discounts applied, time, date, and place of purchase, payment type. This information may be received by marketing computer database either by marketing computer 40 reading the sequential product identifiers as they are scanned during each transaction, optionally by marketing computer 40 reading the log of each transaction transmitted on the LAN (the same file read by POS computer 80), or as data file transfer from POS computer 80 to marketing computer 40.

Targeting criteria 450 includes criteria for providing to certain customer identifications, certain promotions or marketing content 460, including coupons, rebates, instant discounts, advertisements, marketing information to be offered or presented to the customer, and code for applying those criteria to customers' purchase transaction data and other data associated with the customers.

Marketing content 460 includes coupons, rebates, instant discounts, advertisements, marketing information to be offered or presented to the customer. Particular marketing is usually associated with particular targeting criteria. For example, a targeting criteria specifying repeated purchase of diapers in a prior one month period may be linked to content specifying a coupon for baby food.

Figure 4:
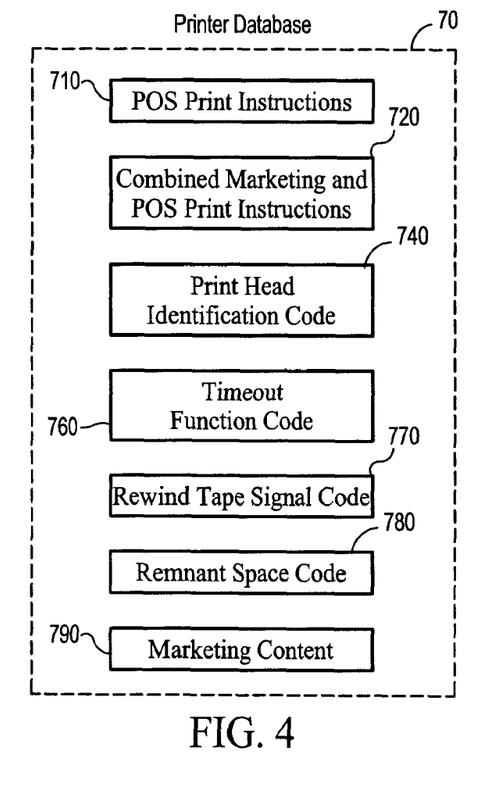
FIG. 4 is a schematic of a data structure of printer database 70 of FIG. 1.

FIG. 4 shows printer database 70 of FIG. 1 including POS print instructions 710, combined marketing and POS print instructions 720, marketing content 730, print head identification code 740, EOT signal code 750, time out function code 760, rewind tape signal code 770, remnant space code 780, and marketing content 790.

POS print instructions 720 includes instructions to print all the transaction data for printing a register receipt for the customer's transaction. This typically includes the product descriptions (names) of the products purchased (or the product identifiers if the printer logic is where the identifiers and product descriptions are associated), price, quantity, discounts, time, date, and place of purchase; payment type, and transaction totals with and without applied discounts.

Combined marketing and POS print instructions 720 include instructions for printing both the register receipt information for the customer's transaction and certain marketing content, such as coupons, rebates, instant discounts, and advertisements.

Print head identification code 740 includes data that specifies which of print heads 650 are to print marketing and register receipt information, timing of printing, and order of printing. Print head identification code may run in POS printer 60 by processing instructions 710 or 720.

Rewind tape signal code 770 is code that specifies rewinding of the printer's paper tape. It enable printer 60 to rewind the paper tape after printing on a first side of the paper tape to enable subsequent printing on the opposite second side of the paper tape along the same length of the paper tape having printing on the first side. Rewind tape signal code 770 may run in POS printer 60 by processing instructions 710 or 720. In one example, instructions 720 are received at POS printer 60 after POS printer 60 initiated printing based upon instructions 710. Then, Rewind tape signal code 770 instructs POS printer 60 to rewind paper tape 660 in order to print based upon marketing content contained in instructions 720, on the opposite side of paper tape 660 from where register receipt information was printed.

Remnant space code 780 includes instructions for printing marketing content and register receipt information in such a way as to optimize the use of blank space on paper tape 660. Code operating on print information 720 determines the length of paper tape 660 to print register receipt information, and the length of paper tape required to print marketing information based upon instruction 720. Remnant space code 780 determines the difference paper tape length which would otherwise be blank paper tape on one side of the paper tape. Remnant space code 780 then determines how to fill any blank space on either side.

Marketing content 790 includes for example, data defining incentive offers and advertisements, including any text, graphics, and color thereof associated therewith. Marketing content may be stored either in printer database 70 or marketing computer database 50. Marketing computer database 50 and printer database 70 may both store an association of marketing content identifiers to marketing content. If marketing computer 40 transmits marketing identifiers to printer 60, printer 60 may associate marketing content for printing with the corresponding marketing identifiers.

In one embodiment, remnant space code may determine additional marketing material to print to fill the blank space. It may compare the length of various selected marketing items and prints only those marketing items that would fit on the length of paper tape 660 required for the register receipt information. That is, limit printed paper tape length by deletion of marketing items. It may identify additional marketing content to print in blank spaces, if any, on either side of the paper tape. It may resize text or graphics so that marketing content and register receipt information contained in instruction 720 each occupy approximately the same length of paper tape, so that two sided printing with marketing content on one side and register receipt information on the other side occupy the same length of paper tape.

Remnant space code 780, in addition with the other code mentioned herein, acts to generate one or more print files associated with each purchase transaction for printing for that transaction.

Time out function code 760 is code specifying a time period after receipt by POS printer 60 of EOT signal 340 at which POS printer 60 will print based upon instruction 710 if POS printer 60 has not received instruction 720 by the end of that time period. For example, code 760 may do this by placing in printer queue memory from which printing occurs without requiring any further signals the transaction data it received from POS terminal 20 based upon instructions 710. Time out function code 760 may be programmed to act for example 1, 1.5, or 2 seconds after receipt by POS printer 60 of EOT signal 340. This time period is selected to limit delay in processing purchase orders.

In alternative embodiments, either POS printer 60 or marketing computer 40 could determine which marketing content to print, the length on paper tape 660 of that marketing content, the length of white space on the transaction content 720 side of paper tape 660, and then print additional marketing content in the white space on the transaction content side of paper tape 660. That is, the code specifying the print data and instructions, or the print file could reside on any of these computers, and they could send the final print file or files, including control signals for rewind of the paper tape, if necessary, to printer 60 for printing.

Figure 5:
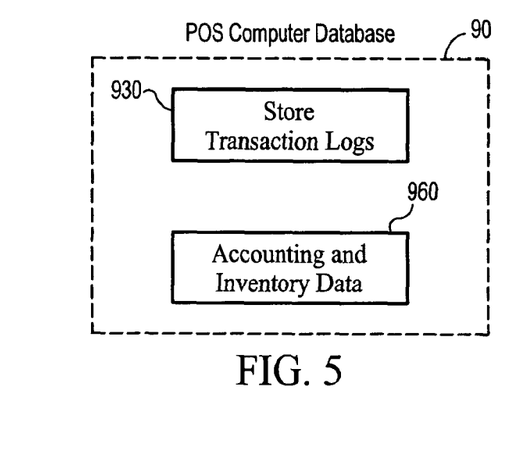
FIG. 5 is a schematic of a data structure of POS computer database 90 of FIG. 1.

FIG. 5 shows POS computer database 90 of FIG. 1 as including store transaction logs 930 and accounting and inventory information 960. Store transaction logs 930 store all transaction data for all transactions for that retail store. Accounting and inventory information 960 includes sales information and lists of items and quantities thereof in stock, etc.

Figure 6:
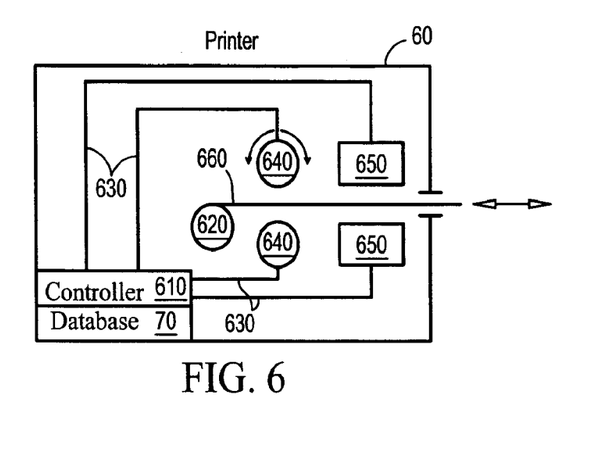
FIG. 6 is a schematic of POS printer 60 of FIG. 1.

FIG. 6 shows POS printer 60 of FIG. 1 including controller 610, paper tape roll 620, paper tape 660, control lines 630, rollers 640, and print heads 650, and database 70.

Controller 610, via control lines 630, instructs print heads 650 when and what to print, and instructs rollers 640 when to roll the paper out and roll the paper back. Controller 610 acts pursuant to instructions generated by code run in POS printer 60 or received from other elements of the network. Printing includes controller 610 instructing, via control lines 630, rollers 640 to advance paper tape 660 in conjunction with instructions to print heads 650 to print either transaction content 720 or marketing content 730, and optionally instructions to retract paper tape 660 after certain printing. Although shown as part of POS printer 60, controller 610 may be remote from the print heads, and its functions may be performed elsewhere, such as in the POS computer or the marketing computer.

One of printer heads 650 faces a first side of paper tape 660. Another of printer heads 650 faces an opposite second side of paper tape 660. Hence each print head prints to a different side of paper tape 660.

Paper tape roll 620 includes a spooling mechanism (not shown) upon which rolled up paper tape 660 is mounted.

Preferably, one print head is an ink jet print head and the other print head is a thermal print head. Preferably, paper tape 660 has one side formed from thermally sensitive paper to enable printing by thermal print head 650 onto that side of paper, and paper tape 660 is oriented with the thermally sensitive paper side facing the thermal print head 650. The print head (other than thermal) may be either a black and white or a color print head.

Figure 7:
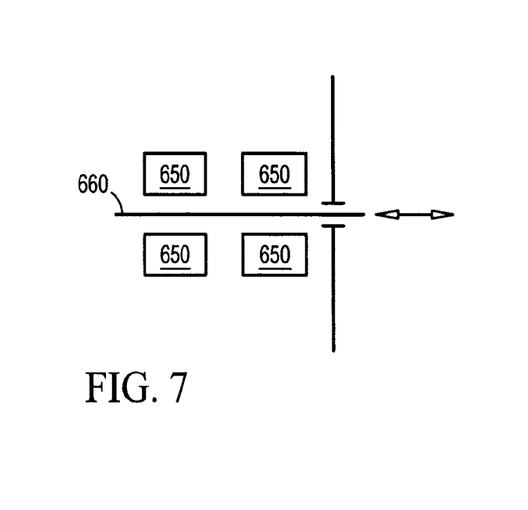
FIG. 7 is a partial schematic of alternative POS printer 60 having four print heads.

FIG. 7 shows an alternative configuration of print heads 650 including four print heads. In this configuration, each side of the paper may face two different types of print heads, any of thermal, ink jet, and laser jet. Alternatively, both print head facing the same side of paper may be of the same design, both thermal, both ink jet, or both laser jet.

The relative locations of print heads on opposite sides of paper tape 660 may be directly opposed to one another or offset along the direction of tape movement from one another.

Figure 8:
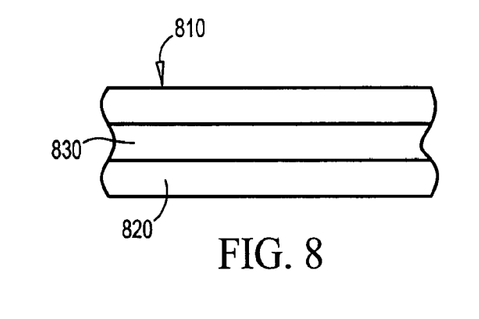
FIG. 8 is a schematic side section view of paper tape 660 of FIG. 6.

FIG. 8 shows a side section of paper tape 660 of FIG. 6 including upper paper side 810, lower paper side 820, and impermeable layer 830. In the preferred embodiment, impermeable layer 830 exists and prevents ink from bleeding from one side of the paper tape to the other side. Upper paper tape side 810 may be thermally printer sensitive paper, such as paper containing temperature sensitive dyes and/or phenols, and lower paper side 820 may be thermal printer insensitive paper Impermeable layer 830 may for example be polyvinyl, or some other polymeric material.

Figure 9:
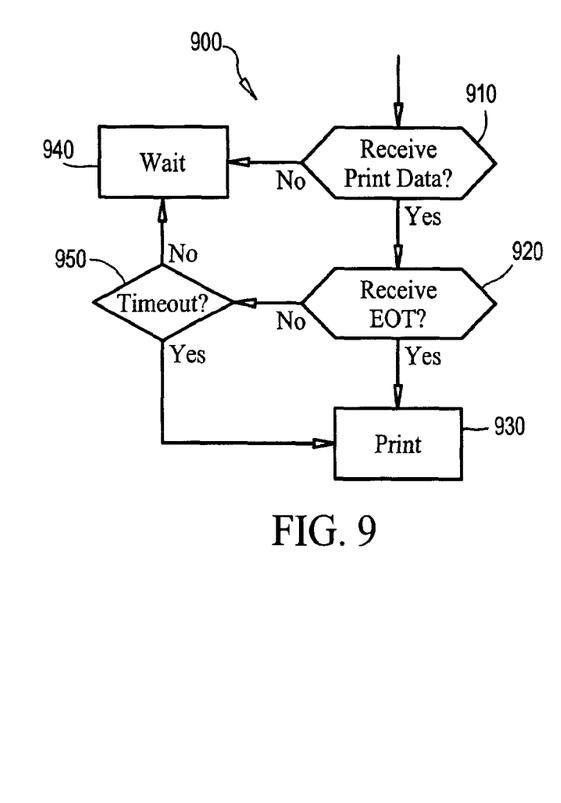
FIG. 9 is a flowchart for controlling printing by POS printer 60.

FIG. 9 shows printer logic 9000 having steps that may be executed in a CPU in POS printer 60. In step 910, printer logic determines whether printer data was received. If yes, execute step 920, In step 920, printer logic determines whether an EOT signal was received. If yes, execute step 930, printer logic prints the print file.

If step 910 is no, execute wait state 940 and then execute 910 again.

If step 920 is no, execute time out check 950. If step 950 is no, execute wait state 940 and then check 910 again. If step 950 is yes, execute print step 930. Wait state 940 may be for example 50 milliseconds.

Figure 10:
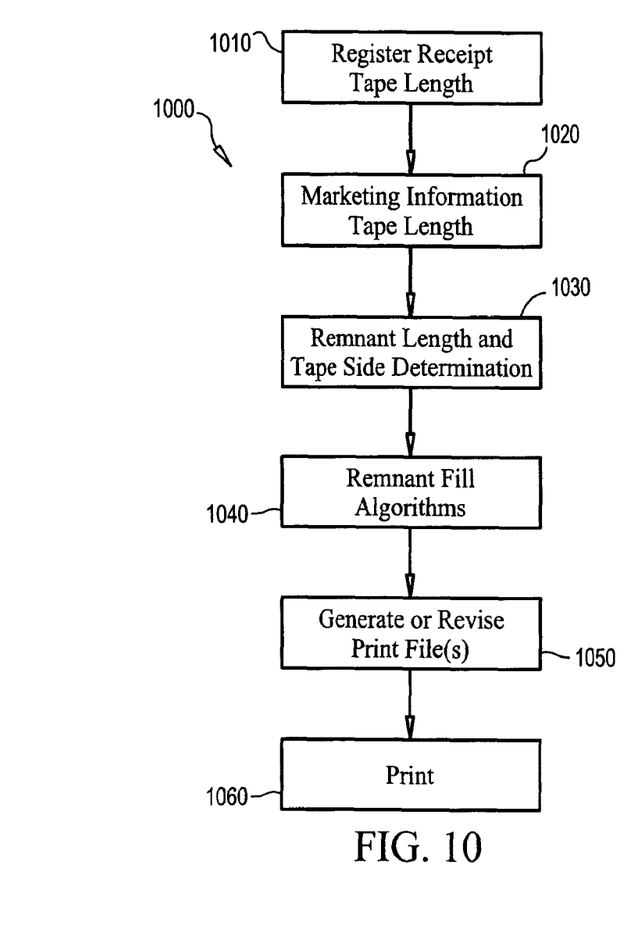
FIG. 10 is a flowchart for controlling printing by POS printer 60.

FIG. 10 shows remnant logic 1000 in which either POS printer 60 or marketing computer 40 performs the calculations to determine the optimal amount of marketing content 460 to fill up the space on both sides of paper tape 660.

FIG. 10 shows method 1000 including determining register receipt paper tape print length 1010, determining marketing content paper tape print length 1020, determine remnant tape length and blank space tape side 1030, determine marketing content to fill remnant space 1040, generate or revise print file 1050, and print 1060.

In step 1050, printer logic generates or revises one or more print files to include printing of the additional marketing material in the register tape including the customer's transaction data and marketing material. Additional marketing material may be determined for example by filtering tape print length of a set of additional marketing materials to exclude those additional marketing materials having a tape print length greater than the remnant tape length, and then by ranking the resulting set of additional marketing materials. The ranking may be based upon correlation to other marketing materials for that customer, in order of remuneration to the marketing company from the manufacturer or retailer for such printing, or by correlation of the product identifies in the marketing material to demographics associated with the customer's identifier.

In one embodiment, POS printer 60 (1) determines the length of paper tape 660 required to print the customer's receipt, consisting of transaction content 720, (2) determines the length of various examples of marketing content and (3) prints only examples of content that would fit on the length of paper tape 660 required for printing the receipt.

In another embodiment, either POS printer 60 or marketing computer 40 could be configured and coded to determine what marketing content to print, the length of paper tape containing marketing content, the length of white (available) space on the register receipt side of paper tape 660 resulting therefrom, and is coded to print additional marketing content on the white space on the transaction content side of paper tape 660.

In one embodiment, remnant space code identifies a white space area, identifies marketing content to associate with that white space, and then scales (up or down) the size of fonts and/or graphics of the associated marketing content to fit the identified white space.

Figure 11:
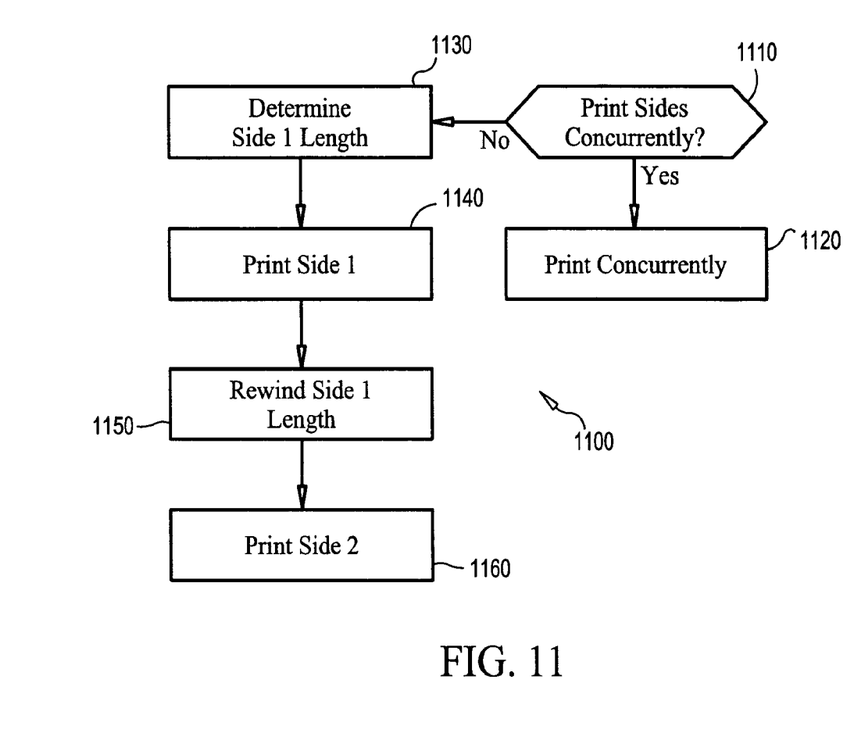
FIG. 11 is a flowchart for controlling printing by POS printer 60.

FIG. 11 shows printer logic relating to two sided printing.

In step 1110, printer logic determines whether to print concurrently on both sides of register tape 660. For example, printer logic may examine print contents to determine the required print speed to print both sides, and decide to print concurrently if print speeds are compatible. If yes, execute step 1120 to concurrently print to both sides. If no, execute step 1130 to determine which side to print first. In step 1140, print to the first side. In step 1150, rewind the paper tape 660 the length of the side 1 printing (or slightly less, such as 0.5 inches or 1 centimeter less, to avoid the paper tape from losing registration with the rollers in the printer). In step 1160, print side two.

Once POS printer 60 has received combined print instructions 720, POS printer 60 can print both paper sides concurrently, interleave printing on both sides, or print one side in its entirety first, as specified by business rules embedded in code.

Code executing in POS printer 60 can implement time out function code 760, such that, if POS printer 60 does not receive instructions 720 within the specified time period, POS printer 60 proceeds to print transaction content 720 for the customer.

Likewise, code executing in POS printer 60 can implement another time out function such that, if POS printer 60 does not receive instructions 710 within the specified time period, POS printer 60 proceeds to print based upon instructions 720.

If POS printer 60 receives instructions 720 while printing based upon instructions 710, code could direct POS printer 60 to print the marketing content specified by instructions 720 after completing printing the register receipt specified by code 710. This may include implementing code to rewind the register tape by the length of the register receipt before printing marketing content based upon instruction 720.

Marketing content and pointers thereto may reside in printer 60, and instructions 720 may include pointers to that marketing content instead of actual marketing content. If so, corresponding pointers exist in the database accessible by marketing computer 40.

The printing aspects, such as EOT and time out printing functions determining which data source, POS terminal or marketing computer, to use to print the register receipt, do not require a two sided printer or two sided printing.

Aspects and specific embodiments of the invention presented above are not intended to limit the scope of protection based upon the broad concepts disclosed above.

The invention claimed is:

1. A computer-implemented method of generating print instructions to cause printing of a dual-sided purchase transaction receipt that includes transaction information and marketing information, the method being implemented on a computer system having one or more physical processors programmed by computer program instructions that, when executed, program the computer system to perform the method, the method comprising:
   receiving, by the computer system, from a point of sale (POS) computer system separate from the computer system, transaction information that identifies a first item being purchased during a purchase transaction;
   receiving, by the computer system, an end of transaction (EOT) signal from the POS computer system, wherein the EOT signal indicates an end of the purchase transaction;
   determining, by the computer system, marketing information based on the transaction information responsive to the EOT signal, wherein the marketing information comprises at least first marketing content;
   generating, by the computer system, print instructions comprising the transaction information and the marketing information, wherein the print instructions include an instruction to print a purchase transaction receipt that includes the transaction information and the marketing information, and wherein the print instructions further comprise an instruction to print the transaction information on a first side of the purchase transaction receipt and the marketing information on a second side of the purchase transaction receipt;
   determining, by the computer system, a remnant space on either the first side of the purchase transaction receipt or the second side of the purchase transaction receipt based on a first length of the transaction information that occupies the first side and a second length of the marketing information that occupies the second side;
   identifying, by the computer system, additional marketing content to include in the remnant space, wherein the print instructions further comprise the additional marketing content and an instruction to place the additional marketing content in the remnant space; and
   providing, by the computer system, the print instructions to be used to print the purchase transaction receipt.

2. The method of claim 1, wherein identifying additional marketing content comprises ranking a plurality of additional marketing content with respect to one another and selecting the additional marketing content based on the ranking.

3. A computer-implemented method of generating print instructions to cause printing of a dual-sided purchase transaction receipt that includes transaction information and marketing information, the method being implemented on a computer system having one or more physical processors programmed by computer program instructions that, when executed, program the computer system to perform the method, the method comprising:
   receiving, by the computer system, from a point of sale (POS) computer system separate from the computer system, transaction information that identifies a first item being purchased during a purchase transaction;

receiving, by the computer system, an end of transaction (EOT) signal from the POS computer system, wherein the EOT signal indicates an end of the purchase transaction;

determining, by the computer system, marketing information based on the transaction information responsive to the EOT signal, wherein the marketing information comprises at least first marketing content;

generating, by the computer system, print instructions comprising the transaction information and the marketing information, wherein the print instructions include an instruction to print a purchase transaction receipt that includes the transaction information and the marketing information;

scaling, by the computer system, a size of text or graphics associated with: (i) the transaction information, (ii) the marketing information, or (iii) both, to fit within a particular length of the purchase transaction receipt; and providing, by the computer system, the print instructions to be used to print the purchase transaction receipt.

4. The method of claim 3, wherein the print instructions further comprise an instruction to print the transaction information on a first side of the purchase transaction receipt and at least a portion of the marketing information on the first side of the purchase transaction receipt.

5. The method of claim 3, wherein receiving the transaction information comprises:

receiving first item identification information as the first item is read via the POS computer; and receiving second item identification information as a second item is read via the POS computer after the first item is read.

6. The method of claim 3, the method further comprising:

receiving customer identification information that identifies a customer associated with the purchase transaction; and storing the transaction information in association with the customer identification information to generate a historical transaction record for the customer, wherein the historical transaction record is to be used to determine at least a portion of the marketing information.

7. The method of claim 3, the method further comprising:

receiving customer identification information that identifies a customer associated with the purchase transaction; and storing the transaction information in association with the customer identification information to generate a historical transaction record for the customer, wherein the historical transaction record is to be used to determine additional marketing content to include in the marketing information.

8. The method of claim 3, the method further comprising:

receiving customer identification information that identifies a customer associated with the purchase transaction; and obtaining additional marketing content that was received from a remote computer system in association with the customer identification information, wherein the additional marketing content is included with the marketing information.

9. A system for generating print instructions to cause printing of a dual-sided purchase transaction receipt that includes transaction information and marketing information, the system comprising:

a computer system comprising one or more physical processors programmed with computer program instructions to:

receive, from a point of sale (POS) computer system separate from the computer system, transaction information that identifies a first item being purchased during a purchase transaction;

receive an end of transaction (EOT) signal from the POS computer system, wherein the EOT signal indicates an end of the purchase transaction;

determine marketing information based on the transaction information responsive to the EOT signal, wherein the marketing information comprises at least first marketing content;

generate print instructions comprising the transaction information and the marketing information, wherein the print instructions include an instruction to print a purchase transaction receipt that includes the transaction information and the marketing information, and wherein the print instructions further comprise an instruction to print the transaction information on a first side of the purchase transaction receipt and the marketing information on a second side of the purchase transaction receipt;

determine a remnant space on either the first side of the purchase transaction receipt or the second side of the purchase transaction receipt based on a first length of the transaction information that occupies the first side and a second length of the marketing information that occupies the second side;

identify additional marketing content to include in the remnant space, wherein the print instructions further comprise the additional marketing content and an instruction to place the additional marketing content in the remnant space; and provide the print instructions to be used to print the purchase transaction receipt.

10. The system of claim 9, wherein to identify additional marketing content, the computer system is programmed to:

rank a plurality of additional marketing content with respect to one another and select the additional marketing content based on the rank.

11. A system for generating print instructions to cause printing of a dual-sided purchase transaction receipt that includes transaction information and marketing information, the system comprising:

a computer system comprising one or more physical processors programmed with computer program instructions to:

receive from a point of sale (POS) computer system separate from the computer system, transaction information that identifies a first item being purchased during a purchase transaction;

receive an end of transaction (EOT) signal from the POS computer system, wherein the EOT signal indicates an end of the purchase transaction;

determine marketing information based on the transaction information responsive to the EOT signal, wherein the marketing information comprises at least first marketing content;

generate print instructions comprising the transaction information and the marketing information, wherein the print instructions include an instruction to print a purchase transaction receipt that includes the transaction information and the marketing information;

scale a size of text or graphics associated with: (i) the transaction information, (ii) the marketing information, or (iii) both, to fit within a particular length of the purchase transaction receipt; and provide the print instructions to be used to print the purchase transaction receipt.

12. The system of claim 11, wherein the print instructions further comprise an instruction to print the transaction information on a first side of the purchase transaction receipt and at least a portion of the marketing information on the first side of the purchase transaction receipt.

13. The system of claim 11, wherein to receive the transaction information, the computer system is further programmed to:
   receive first item identification information as the first item is read via the POS computer; and
   receive second item identification information as a second item is read via the POS computer after the first item is read.

14. The system of claim 11, wherein the computer system is further programmed to:
   receive customer identification information that identifies a customer associated with the purchase transaction; and
   store the transaction information in association with the customer identification information to generate a historical transaction record for the customer, wherein the historical transaction record is to be used to determine at least a portion of the marketing information.

15. The system of claim 11, wherein the computer system is further programmed to:
   receive customer identification information that identifies a customer associated with the purchase transaction; and
   store the transaction information in association with the customer identification information to generate a historical transaction record for the customer, wherein the historical transaction record is to be used to determine additional marketing content to include in the marketing information.

16. The system of claim 11, wherein the computer system is further programmed to:
   receive customer identification information that identifies a customer associated with the purchase transaction; and
   obtain additional marketing content that was received from a remote computer system in association with the customer identification information, wherein the additional marketing content is included with the marketing information.

* * * * *